J. E. WRIGHT.
PUNCHED CARD CONTROLLED MECHANISM.
APPLICATION FILED APR. 25, 1917.
1,299,090.
Patented Apr. 1, 1919.
4 SHEETS—SHEET 1.
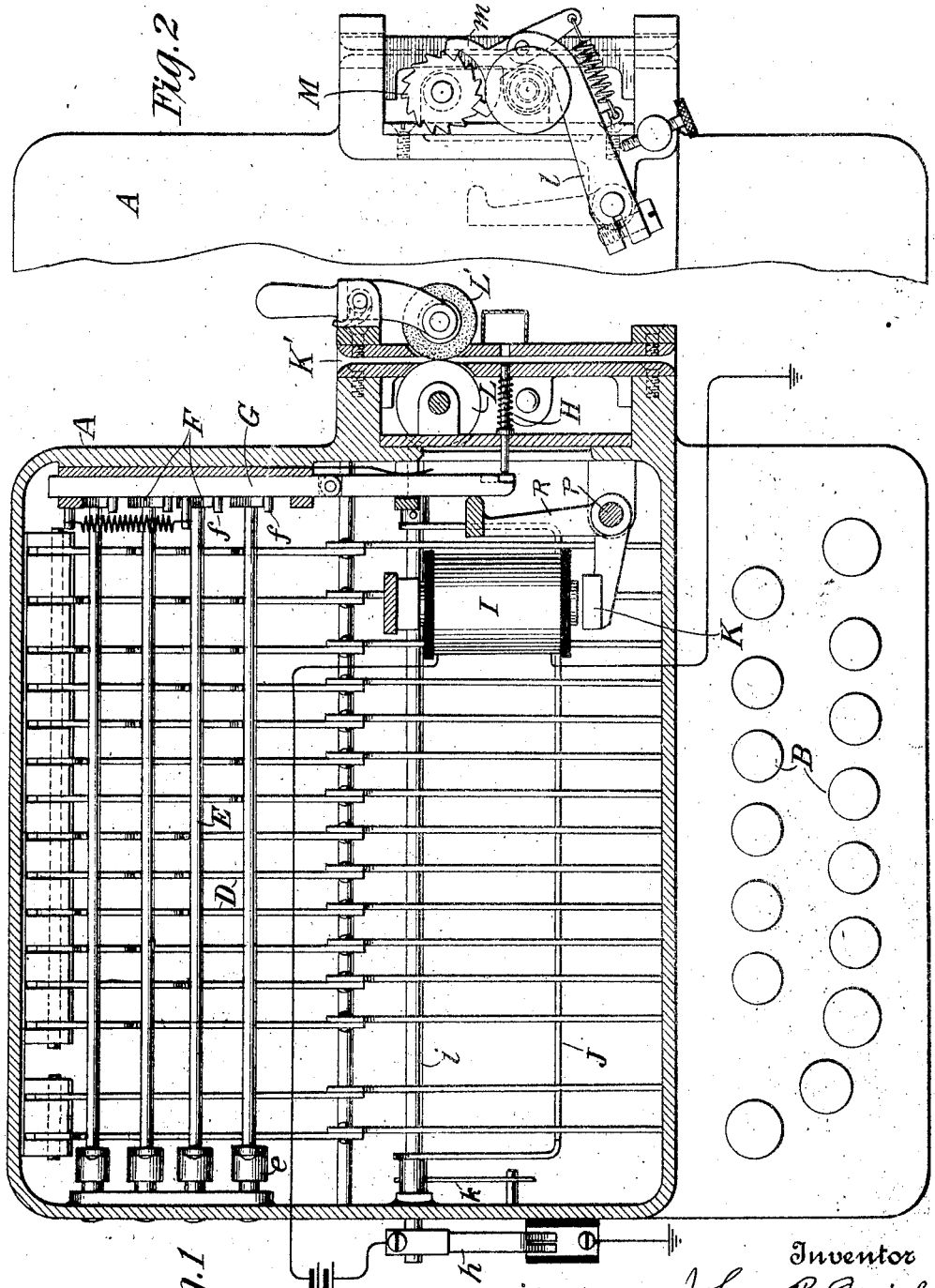
Inventor
John E. Wright
By his Attorneys

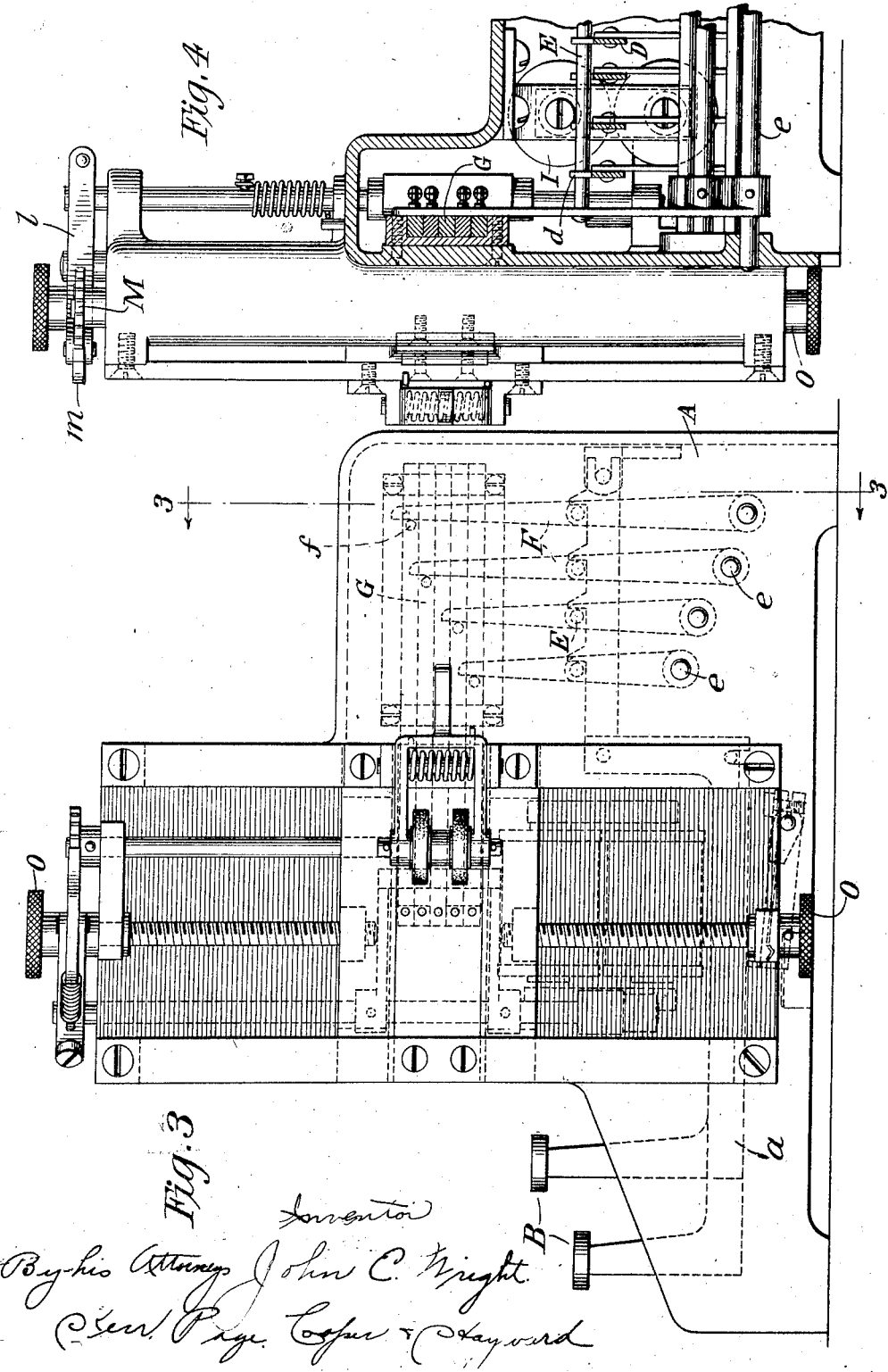

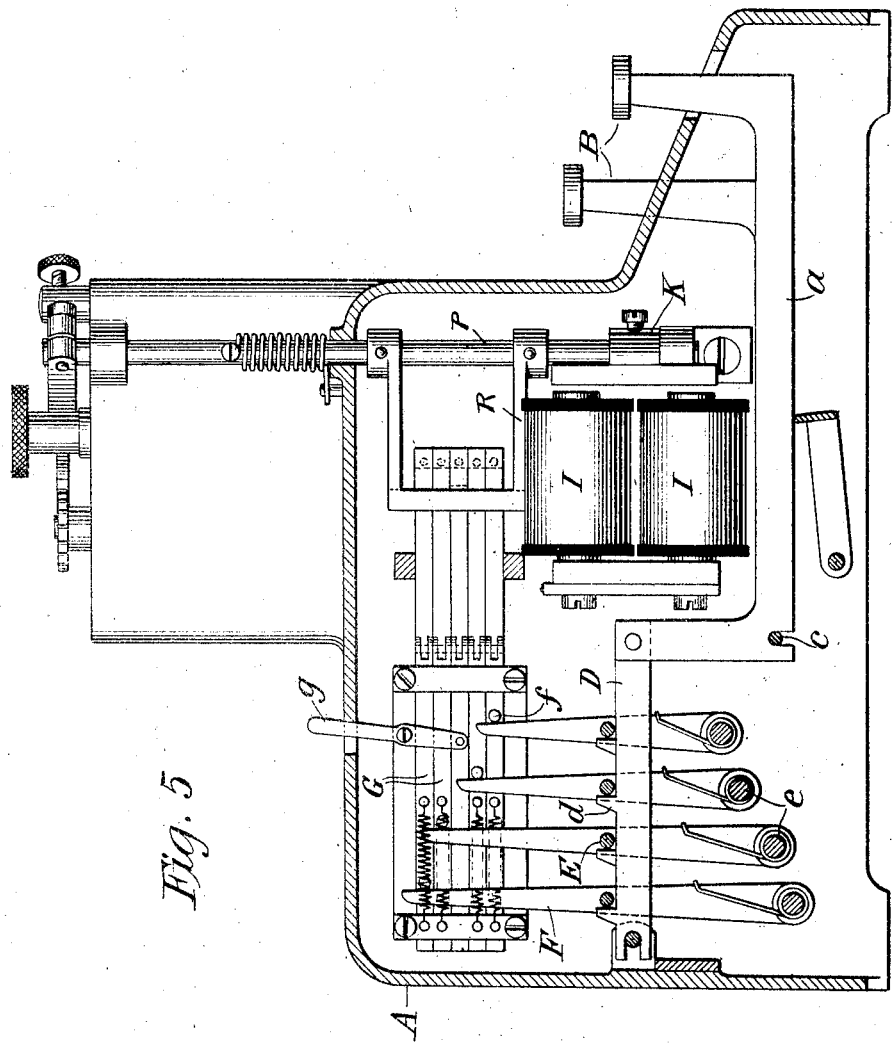

J. E. WRIGHT.
PUNCHED CARD CONTROLLED MECHANISM.
APPLICATION FILED APR. 25, 1917.
1,299,090.
Patented Apr. 1, 1919.
4 SHEETS—SHEET 4.
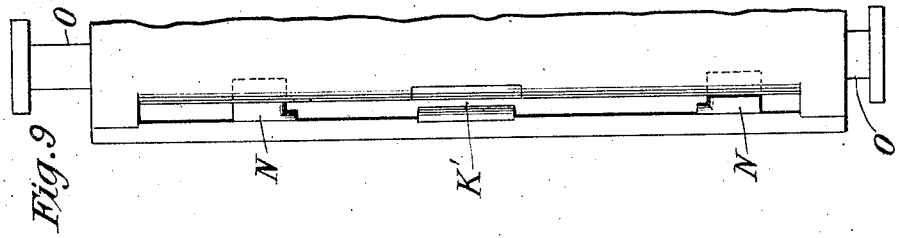
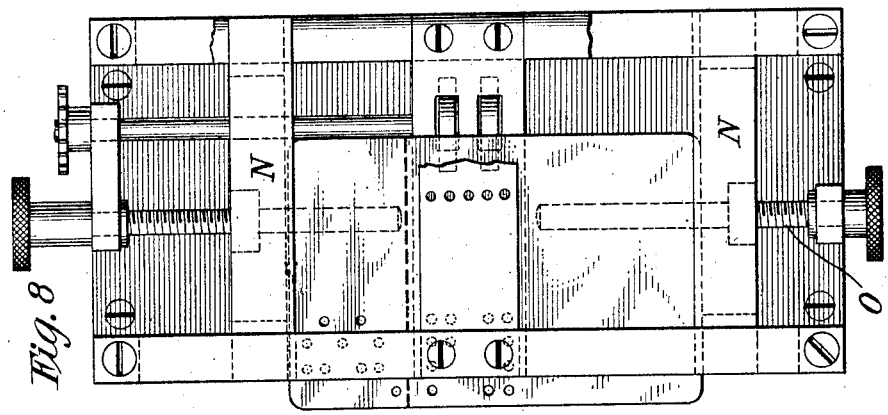
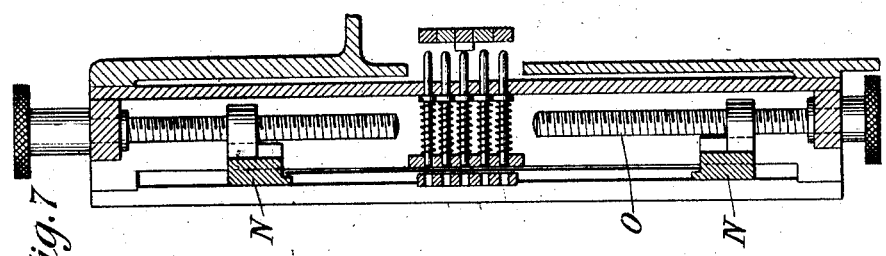
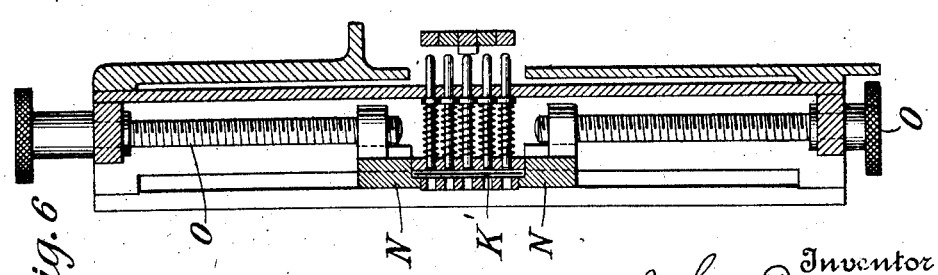
Inventor
John E. Wright
By his Attorneys

UNITED STATES PATENT OFFICE.

JOHN EDWARD WRIGHT, OF NEW YORK, N. Y.

PUNCHED-CARD-CONTROLLED MECHANISM.

1,299,090.  Specification of Letters Patent.  Patented Apr. 1, 1919.

Application filed April 25, 1917. Serial No. 164,584.

*To all whom it may concern:*

Be it known that I, JOHN E. WRIGHT, a citizen of the United States, residing at New York, in the county and State of New York, have invented certain new and useful Improvements in Punched-Card-Controlled Mechanism, of which the following is a full, clear, and exact description.

The invention upon which the present application for Letters Patent is based, pertains to computing systems and is embodied in new and improved means for controlling by means of punched cards or tape, apparatus designed for recording or reproducing the data corresponding to the character or positions of said perforations.

In order that the purpose and hence the nature of the various improvements involved in the practical carrying out of the invention as a whole may be more readily comprehended, a statement, of somewhat general character, of the system may be profitably made. For this purpose, let it be assumed that in a department store, where the character of the operations are such as to make tabulations and computations of the transactions highly important, but their extent is not such as to justify the use of the cumbersome and expensive machines ordinarily used for the purpose, each counter or department be provided with a simple form of perforator by means of which cards or a tape may be readily perforated by a salesman to indicate the amount of each sale.

Assuming that this record has been made on a continuous length of tape, the latter is periodically transferred to the cashier's department, where it is run through a reproducer which is operated by suitable mechanism according to the position of the holes to record the items and totals of the amounts or other data indicated by the punched holes in the tape. Such record may be made upon cards which are preserved as records of sales made over any given counter or any given department.

In case the amounts of sales are punched in cards, these cards will have other perforations punched therein either in advance of or at the time of sales which indicate the department where the sales were made, their date or other necessary information, and these cards may be kept as permanent records or their indications may be totaled by the reproducer. If they are preserved and it becomes necessary at any time or for any purpose to select from a number of them those which contain the records for a certain date or for a certain department, they are run through a selector, which, operated according to the perforations in individual cards, selects and distributes them by a single operation so that all the cards of a certain kind or class may be immediately obtained.

The system may involve numerous other steps, the tapes or cards may be punched to afford records of other facts or transactions, and the reproducer may make other and more elaborate records, as will be well understood by those using the system or skilled in the art to which it pertains, but for the purpose of the present case the above outline will serve to show the nature and general purpose of the subject.

From the above it is manifest that the system in its entirety involves virtually the combination or conjoint use of three separate instrumentalities.

First. A perforating machine adapted to selectively punch either cards or tape.

Second. A selecting mechanism in which the operations of a card holder and chute are so controlled as to separate out of a mass the cards of a certain class or character from such as are not wanted, and Third. A reproducer controlled by a perforated card or tape, which actuates suitable mechanism, such as the keys of an adding machine, causing it to reproduce in numerals or letters the totals of any record which corresponds to the holes punched, or other data according to the nature and requirements of the case.

In the present case I have shown, described and shall claim that instrumentality referred to above as the perforator, as the others will form the subjects of separate applications: The improvements which characterize this instrument are to a large extent embodied in the construction of its parts or elements, and no description thereof will be required for an understanding of their nature beyond that contained in the detailed explanation with its reference to the drawings which is given below.

In the accompanying drawings, Figure 1 is a horizontal sectional plan of the perforating mechanism.

Fig. 2 is a similar view of the feed mechanism for use in the same.

Fig. 3 is a side elevation of the apparatus of Fig. 1.

Fig. 4 is a sectional view of the same on line 3—3 of Fig. 3.

Fig. 5 is a part sectional view of the apparatus as viewed from the left.

Figs. 6 and 7 are sectional views of modifications of the punching mechanism.

Figs. 8 and 9 are views of those portions of the perforator more directly concerned with the handling of cards or tape.

The instrument is contained in a suitable frame work A and comprises, primarily, a set of keys B the number of which is purely arbitrary. By reference to Fig. 5, it will be seen that by the depression of these keys the right-angled levers $a$ on which they are mounted and which are pivoted at $c$ draw forward the horizontal bars D each carrying one or more projections $d$.

These projections engage cross-bars E in frames pivoted at $e$ and having at the right in Figs. 1, 3 and 4 side bars F lying in the path of pins $f$ on slide bars G and adapted to move said bars longitudinally when said side bars are moved by the depression of the keys.

A depressed key may engage one or more cross bars D and thereby adjust one or more of the slides G, these parts constituting a selective series of permutation elements that determine which punches will be operated by the movement or adjustment of the slides G. For this purpose there are shown four slides G adapted to be so adjusted, and a central slide the position of which is controlled by a hand lever $g$, Fig. 5.

The slides G have their forward ends pivoted to their main portions and at their extreme ends have offsets or cut away portions which lie normally in front of the spring actuated punches H. When, therefore, slides G are shifted, the full portion will be brought in line with said punches and a swinging movement imparted to the pivoted ends will force forward the punches.

This forward movement is imparted to the slides by an armature K of an electromagnet I the circuit of which is closed when any key is depressed to substantially its full extent, so that a card or tape will be punched with a hole or holes corresponding in position to the operated key.

The armature K is fixed to a shaft P which carries a frame R turning therewith, the outer side of the frame as shown in Figs. 1 and 5 lying over the pivoted ends of the slides G so that by the operation of the armature magnet such ends of the slides are forced toward the punches H.

Under the bank of keys is a bar J forming part of a frame secured to a shaft $i$ which is turned by the depression of a key against the force of a spring $k$ to swing a contact $h$ into engagement with a conducting stop and thus close the circuit of the magnet I at the proper time to operate the punches.

The cards or the tape to be punched passes through a guide or chute K' in which it is engaged by wheels L, L', the former on the same shaft as a ratchet wheel M engaged and adapted to be moved step by step by a pawl $m$ operated on the back stroke of the armature of magnet I by means of an arm $l$ carrying said pawl. Whenever a key lever, therefore, is depressed, the card or tape is fed forward one space.

The arm $l$ is fixed to the shaft carried and oscillated by the armature K and partakes of the same movement as said armature; hence, when the armature is attracted and released, the arm $l$ moves and operates the pawl for moving the ratchet wheel one tooth.

When cards are punched by this device the hand lever $g$ is turned to the position in which it maintains its slide bar G raised, and hence is not operative to force forward the central punch. If, on the other hand, a tape is to be perforated the lever $g$ is turned to render its corresponding punch operative, and by this means a row of equally spaced perforations is punched in the tape which are subsequently utilized in the reproducing machine to feed the tape forward by pins on a feed wheel.

The slot K' through which the cards or tapes pass is provided with adjustable sides N, Figs. 6 and 7 which are engaged by adjusting screws O so as to be capable of movement to regulate the width of the slot. Fig. 6, for example, shows the slot adjusted for tape, while in Fig. 7 the wider adjustment shown is for a card, which is shown in Fig. 8 as passing through the machine.

What I claim is:

1. In a punching device of the kind described, the combination with a series of keys and bars connected therewith and adapted to be moved longitudinally by the depression thereof, of a series of cross-bars one or more of which is engaged by lugs or stops on said bars, pivoted levers constituting a frame for the support of the cross bars, and punch operating mechanism controlled by the engagement therewith of those levers which are moved by the keys and their connected bars.

2. In a punching mechanism of the kind described, the combination with a series of keys and bars adapted to be moved longitudinally by the depression thereof, of a series of cross-bars one or more of which are engaged by lugs or stops on said bars, pivoted levers supporting said cross-bars, slides with parts lying in the path of said levers and punches adapted to be operated by the slides engaged by the moved lever.

3. In a punching mechanism of the kind described, the combination with a series of keys and bars adapted to be moved longitudinally by the depression thereof, of a series of cross-bars one or more of which are engaged by lugs or stops on said bars, pivoted levers supporting said rods, a series of sliding bars with pivoted ends adapted to be shifted longitudinally by the movement of said pivoted levers, a series of punches in the planes of the paths of movement of the sliding bars, and an electro magnet and armature engaging the pivoted ends of the slide bars and operating the punches by such bars as are moved with relation to the punches.

In testimony whereof I affix my signature.

JOHN EDWARD WRIGHT.